Jan. 3, 1956  J. J. FILLIUNG  2,729,109
FLUSH VALVE OPERATING HANDLE UNITS
Filed Dec. 6, 1951
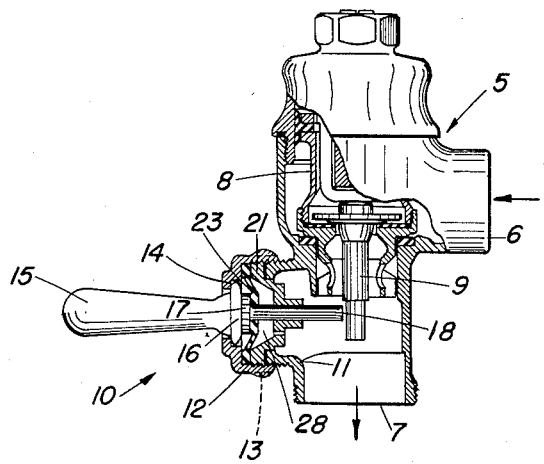
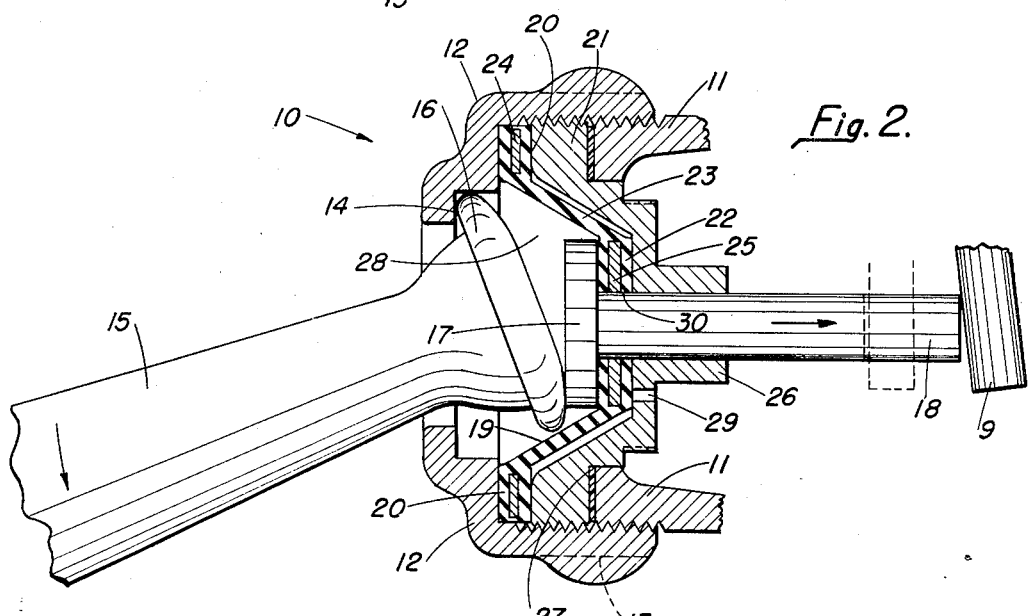
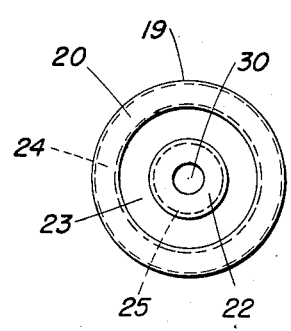
INVENTOR.
JACQUES J. FILLIUNG.
BY
*Parker Carter*
ATTORNEYS.

United States Patent Office 2,729,109
Patented Jan. 3, 1956

2,729,109

FLUSH VALVE OPERATING HANDLE UNITS

Jacques J. Filliung, Chicago, Ill., assignor to Sloan Valve Company, Chicago, Ill., a corporation of Illinois Application December 6, 1951, Serial No. 260,207

2 Claims. (Cl. 74—18.2)

This invention relates in general to valves but more particularly to flush valves for plumbing fixtures and the principal object of the invention is to design a new and improved operating handle unit for actuating a flush valve.

Another object of the invention is to design a new and improved operating handle unit for a flush valve in which the use of a restoring spring for the handle and the usual packing means for preventing leakage, is dispensed with.

A further object is to provide a new and improved operating handle unit which is readily interchangeable with regular flush valve handles and which does not require a separate coupling nut for attaching the same to the flush valve.

Still other objects of the invention are to provide a new and improved operating handle unit comprising few simple parts, which is cheaper to manufacture, easier to assemble, and is smaller in size, thereby conserving materials.

According to one of the principles of the invention, a deformable or flexible diaphragm is provided which is clamped at its periphery across the flush valve handle opening by the handle socket and is flexed or tensioned to normally hold the operating handle extended from the handle socket. The actuation of the handle further flexes the diaphragm and upon release, the stored up energy restores the handle. Excessive flexing of the diaphragm is limited by a bushing spaced from the diaphragm across the flush valve opening and which bushing also guides the plunger stem for initiating the operation of the flush valve. The diaphragm additionally serves as a sealing unit to prevent leakage from the flush valve out through the handle unit.

With the foregoing and other objects in view, the invention consists in certain novel features of construction and arrangement of parts which will hereinafter be more fully pointed out and described, claimed and illustrated in the accompanying drawings in which:

Fig. 1 is a partial cross-sectional view of a conventional flush valve showing the novel operating handle of the invention;

Fig. 2 is an enlarged view in cross-section showing the handle operated, while

Fig. 3 is an end view of the flexible diaphragm.

Referring now particularly to Fig. 1 of the drawings, the invention is illustrated in its preferred application in connection with a flush valve such as is commonly provided in plumbing installations for flushing a water closet or urinal. The reference character 5 indicates generally such a flush valve having the usual water supply inlet 6 and the outlet 7 leading to the plumbing fixture. The valve is provided with a piston 8 and an auxiliary relief valve having a stem 9 adapted to be actuated by the handle operating unit indicated generally at 10 to initiate the operation of the valve. The handle unit 10 is connected to the handle opening 11 of the flush valve 5 by a cup-shaped socket member 12, having a nut 13 formed thereon for application of a wrench for threading the socket member 12 directly onto the handle opening 11. The socket member 12 is provided with an opening on its forward end having a shoulder 14 on its inner side, against which an enlarged portion 16 of the operating handle 15 is adapted to abut. The enlarged handle portion 16 is normally pressed against a head portion 17 of the operating plunger 18, which is adapted to be projected forward whenever the handle 15 is operated or tilted to effect the operation of the auxiliary valve stem 9, as shown in Fig. 2.

Arranged to be clamped within the socket member 12 is a deformable disc-shaped flexible diaphragm 19, preferably made of rubber and having a peripheral edge portion 20 resting against a shoulder of the socket member. Threaded into the socket member 12 between the edge portion 20 of diaphragm 19 and the flush valve opening 11 is a bushing 21 generally cup-shaped, having an extended sleeve portion 26 through the opening of which the plunger stem 18 slidably extends for supporting and guiding the stem. The central portion 22 of the diaphragm 19 is also provided with an opening 30 in its axis, through which the plunger stem 18 extends, with the head portion 17 of the plunger stem normally abutting the outer side of the diaphragm central portion 22. An intermediate portion 23 of the diaphragm 19 extending between the portion 22 and 20 of the diaphragm is arranged to be flexed or tensioned under certain conditions.

Metal ring-shaped inserts 24 and 25 are molded within the outer portion 20 and inner portion 22, respectively, of the diaphragm to stiffen the same at those points as seen in Fig. 3.

The complete handle unit 10 is held in assembled position on the flush valve opening 11 by the handle socket 12, and when detached from the flush valve, is retained in assembled position because the bushing 21 is threaded in the handle socket 12, so that the unit is readily interchangeable with other handle units. Fig. 1 shows the normal position of the handle unit with the operating handle 15 normally projecting horizontally outward from the handle opening of the socket 12 in position to be operated. This position of the handle is maintained due to the tension or flexure of the central portion 23 of diaphragm 19 provided when the unit is assembled, the diaphragm being distorted slightly by such action and flexed into the space 28 formed by the cup-shaped bushing 21.

Whenever the flush valve handle 15 is operated to effect an actuation of the flush valve, it is tilted or oscillated in any desired direction by grasping the outer end of the same. This causes the enlarged portion 16 of the handle to pivot on shoulder 14 in the manner shown in Fig. 2, thereby projecting the headed portion 17 and plunger stem 18 forwardly to actuate or tilt the auxiliary valve stem, thereby initiating the operation of the flush valve. At the same time, the central portion 23 of the diaphragm 19 is flexed or tensioned still further from its original position into the cup-shaped opening 28, thereby storing up additional energy which is subsequently brought into effect when the handle is released, to cause restoration of the same and to pull the headed portion 17 and the plunger stem 18 backward away from engagement with the valve stem 9. The extent of the flexure of diaphragm 19 is limited to the space 28 within the cup-shaped portion of bushing 21, and the limit of operation of both the handle and the plunger head occurs when the central portion 22 of diaphragm 19 strikes the bottom of the cup member 21. This prevents undue stretching and rupture of the diaphragm, and limits the stroke of the plunger 18, as well as the tilting of handle 15, to a positive stop position. In order to expel any water which may be within the space 28 when the handle 15 is operated, an opening 29 is provided in the bottom of the cup-shaped member or bushing 21. This will also prevent any dash-pot effect in the operation of the unit.

The foregoing arrangement of applicant's invention provides a number of advantages, among them being smaller size, occupying less space for the handle unit than formerly, rendering it less conspicuous and saving materials. The use of springs is, of course, dispensed with, since the flexible diaphragm serves for the purpose of restoring the handle after it has been operated, as well as holding it in extended normal position. It also restores the operating plunger, guiding the same at 30 by virtue of its reinforcing insert 25, and additionally, of providing a definite seal to prevent leakage of water outward through the handle opening. The use of the diaphragm 19 also eliminates the need of the usual packing nut and packing material formerly provided around the plunger stem 18 and therefor also eliminates the frictional resistance formerly caused by such packing upon the plunger stem so that it can reciprocate more freely and easily. A fairly heavy restoring spring was formerly required to overcome this friction. According to the present invention the plunger stem may be considered to be free floating since water is admitted to the space in the bushing to lubricate the stem. By the provision of the hex shaped flat side 13 around the handle socket 12, the use of a separate coupling nut is also eliminated. If desired, a ring gasket 27 may be inserted between the bushing 21 and the handle opening 11 to provide a seal at that point.

What is claimed is:

1. In a handle unit for a flush valve, a socket member attached to a wall surrounding an opening in said flush valve, a cup-shaped bushing and a flexible diaphragm clamped together at their peripheries by said socket member against said flush valve opening, the bottom cup-portion of said bushing being spaced apart from the axis of said diaphragm to permit flexing of said diaphragm into said cup-shaped bushing space, an operating plunger having a head portion and a stem slidably extending through an opening in the axis of said diaphragm and the bottom of said bushing, said bushing acting to guide said plunger stem in its movements, a handle in said socket member movable against said plunger head portion for actuating said plunger, said diaphragm being generally disc-shaped and having a thickened outer edge portion clamped to said socket member and a thickened inner axial portion through which said plunger extends, both of said thickened portions being reinforced to provide stiffness and a seal against leakage, the portion of said diaphragm extending between said thickened outer and inner portions being thinner to provide flexibility therein, said diaphragm being normally flexed inwardly towards said cup-shaped bushing to hold said handle in extended position and being additionally flexed by the operation of said handle, said handle and plunger being restored by the tension stored in said diaphragm when the handle is released, the extent of movement of said handle and said plunger being limited by the diaphragm expanding across the cup-shaped space in said bushing and said axial portion engaging the bottom of said bushing, said diaphragm also serving to prevent leakage of water outward from said handle unit, said plunger head portion compressing the axial portion of said diaphragm against the bottom of said bushing to prevent leakage through said diaphragm opening, there being an opening in the bottom of said bushing for expelling water in said bushing space whenever the diaphragm is flexed, and a nut formed on said socket member for attaching said socket member to the wall surrounding the opening in said flush valve.

2. In a handle unit comprising a socket member for attachment to a wall surrounding an opening in a flush valve for operating the same, a cup-shaped bushing and a flexible diaphragm clamped together at their peripheries to said flush valve opening by said socket member, there being a cup-shaped space formed in said bushing into which said diaphragm is adapted to be flexed and expanded, an operating plunger having a stem extending through an opening in said diaphragm and said bushing into said flush valve opening for initiating the operation of said flush valve, said bushing serving to guide said plunger stem in its movements, a head portion on said plunger stem arranged on one side of said diaphragm, said diaphragm being generally disc-shaped and having a thickened outer edge portion clamped to said socket member and a thickened inner axial portion through which said plunger extends, both of said thickened portions being reinforced to provide stiffness and a seal against leakage, the portion of said diaphragm extending between said thickened outer and inner portions being thinner to provide flexibility therein, an operating handle having one end portion resting between a shoulder in said socket member and against said plunger head portion whereby said diaphragm is normally flexed a slight amount into the cup-shaped space in said bushing and said handle is held in extended position from said socket member, said diaphragm being aditionally flexed into said bushing cup-shaped space by the operation of said handle pressing against the head portion of said plunger, the bottom of said cup-shaped bushing serving as a stop to limit the movement of said axial portion of said diaphragm and thereby prevent further flexure of said diaphragm, said plunger head portion compressing the axial portion of said diaphragm against the bottom of said bushing to prevent leakage through said diaphragm opening, the tension stored in said diaphragm restoring said handle and plunger after said handle is released, said diaphragm also serving to exclude leakage outward from said socket member, there being an opening in said bushing for expelling water from the space therein whenever the diaphragm is expanded, and a nut formed on said socket member for attaching said unit to the wall surrounding the flush valve opening.

References Cited in the file of this patent

UNITED STATES PATENTS

| | | |
|---|---|---|
| 113,503 | Dinnen | Apr. 11, 1871 |
| 197,037 | Magnus | Nov. 13, 1877 |
| 356,997 | Gil | Feb. 1, 1887 |
| 1,610,397 | Thorpe | Dec. 14, 1926 |
| 2,427,441 | Butts | Sept. 16, 1947 |
| 2,506,140 | Delany | May 2, 1950 |